United States Patent [19]

Summers

[11] 3,835,953

[45] Sept. 17, 1974

[54] ACOUSTIC CALIPER LOGGING
[75] Inventor: Gerald C. Summers, Dallas, Tex.
[73] Assignee: Simplec Mfg. Co., Inc., Dallas, Tex.
[22] Filed: Jan. 26, 1973
[21] Appl. No.: 326,771

[52] U.S. Cl. 181/0.5 BE, 340/15.5 BE, 340/15.5 TG, 346/33 WL
[51] Int. Cl. G01v 1/40
[58] Field of Search 181/0.5 BE, 0.5 FS, 0.5 P; 340/15.5 BE, 15.5 TG, 183, 182, 18 P; 346/33 WL

[56] References Cited
UNITED STATES PATENTS
3,503,038 3/1970 Baldwin ......................... 187/0.5 BE
3,747,060 7/1973 DeShazo ........................ 181/0.5 BE

*Primary Examiner*—Benjamin A. Borchelt
*Assistant Examiner*—J. V. Doramus
*Attorney, Agent, or Firm*—Richards, Harris & Medlock

[57] ABSTRACT

Acoustic pulses transmitted horizontally from a unit in a borehole are reflected at the borehole walls and the reflections are detected. Time functions representative of travel time of the reflected pulse are then recorded on segmented bases representing limited spaced apart segments of the borehole wall but in a continuous traverse of a path along such wall. In one embodiment, four vertical segments are continuously traversed. In another embodiment, horizontal segments at each of a plurality of successively deeper locations, preferably uniformly spaced, are continuously traversed.

13 Claims, 5 Drawing Figures

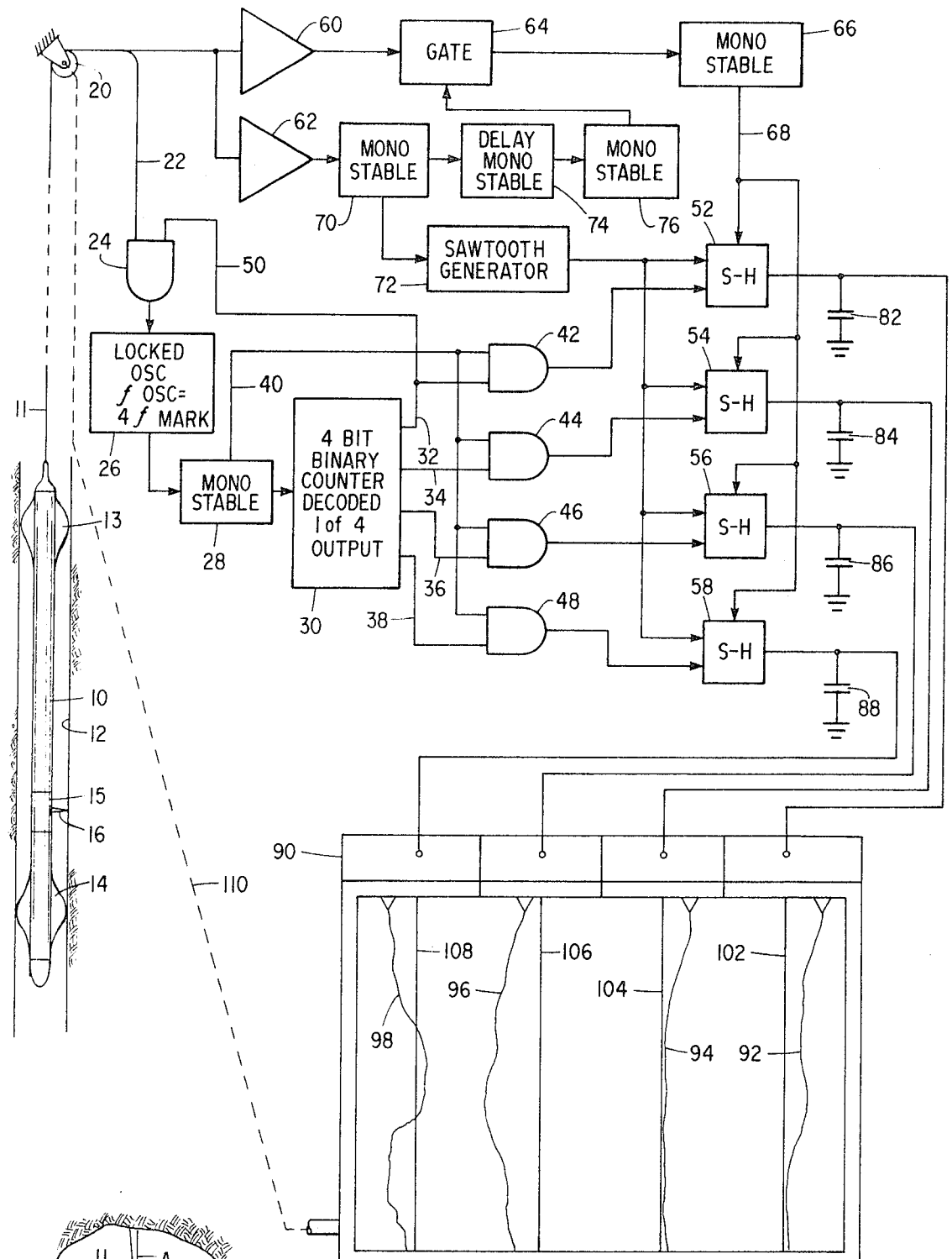
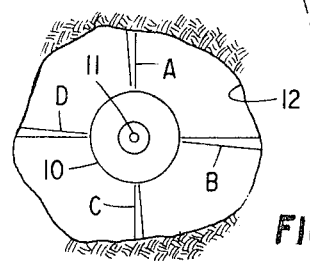
FIG. 1
FIG. 2

ACOUSTIC CALIPER LOGGING

This invention relates to acoustic well logging, and more particularly to the production of a segmented acoustic caliper log.

In well logging operation in accordance with U.S. Pat. No. 2,704,364, the time interval between transmission of an acoustic pulse in a borehole and reception of energy from said pulse at a predetermined receiving location is employed to produce a voltage which may then be recorded.

In accordance with U.S. Pat. No. 3,369,626, the transmission path is horizontal with a single transducer serving as both transmitter and receiver whereby variations in borehole diameter may be portrayed. It is desirable that a continuous record of borehole diameter be provided so that variation in borehole diameter as a function of depth may be recorded for utilization in connection with operation of oil wells and the like. In accordance with the present invention, spaced segments of the borehole walls are scanned continuously. In one aspect, a plurality of parallel vertically extending or spirally extending segments of the borehole wall are cyclically acoustically probed to produce a signal for each segment representative of the radius of the borehole. In accordance with a further aspect, a horizontal path is continuously scanned through 360° of the borehole wall and at each of a plurality of successively different, uniformly spaced locations along the borehole in order to provide a segmented log of borehole diameter.

For a more complete understanding of the present invention and for further objects and advantages thereof, reference may now be had to the following description taken in conjunction with the accompanying drawings in which:

FIG. 1 illustrates one embodiment of the present invention;

FIG. 2 is a top view of the borehole unit of FIG. 1;

Figure 3:
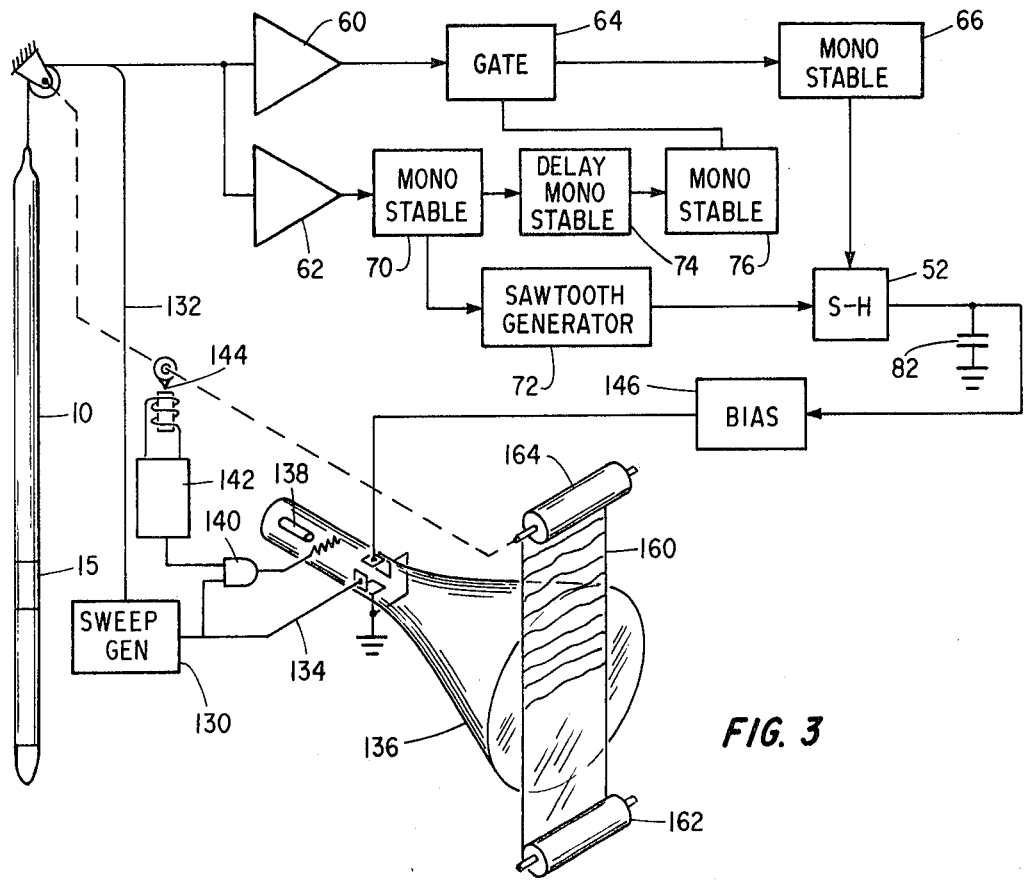
FIG. 3 illustrates a modification of the invention.

The present invention is an improvement over U.S. Pat. No. 3,369,626 which discloses a system wherein characteristics of a near field of a piezoelectric transducer are employed to investigate the characteristics of the wall of a borehole in which the system operates. In accordance with U.S. Pat. No. 3,369,626, a borehole unit includes a motor driven transducer. The transducer is rotated so that it effectively repeatedly scans in a horizontal plane the borehole walls. The transducer is mounted as to be rotated about the vertical axis of the borehole unit. Normally the borehole unit is maintained in a central position in the borehole by centralizer springs. By this means, the reflectivity of the walls of the borehole as indicated by the amplitude of the reflected energy is capable of being portrayed in graphic form. In addition, by measuring the time of travel of the acoustic waves from the instant of transmission to the instant of reception of a reflection of the transmitted energy from the borehole wall, the diameter of the borehole may be measured. Such a system is illustrated in FIG. 2 of U.S. Pat. No. 3,369,626.

The present invention is directed to the provision of a graphic and highly desirable measure of variations in borehole diameter. More particularly, in accordance with the present invention, a borehole unit 10 of the type described in U.S. Pat. No. 3,369,626 is mounted on a cable 11 for travel through a borehole 12. The unit 10 is provided with centralizers 13 and 14 so that it travels centrally of the borehole 12. A transducer unit 15 forming part of unit 10 repeatedly generates an acoustic beam 16 as the transducer system is rotated effectively to scan in a full circle the walls of borehole 12. Normally, the transducer 15 is rotated so that beam 16 sweeps the borehole wall at a rate of one to 10 revolutions per second. The transducer is pulsed at the rate of the order of 1,700 pulses per second so that detailed scanning of the wall is achieved. The transducer is a piezoelectric crystal disk which faces the wall of borehole 12. Because of the relative distance between the borehole wall and the crystal and the diameter of the crystal, the borehole wall is in a portion of the acoustic field generated by the crystal which is generally known as the near field. Because of this, reflections of energy from the borehole wall which are effective in this system, are from a very small area so that the system is highly definitive of the character of the wall and is sensitive to any changes in reflectivity as well as to relatively small changes in borehole diameter.

The present invention is directed to a segmented presentation of variations in borehole diameter, a unique and highly usable form.

More particularly, it will be noted that cable 11 passes over a sheave 20. The signal channel in cable 11 is connected by way of line 22 to an AND gate 24. AND gate 24 is connected to a locked oscillator 26. At a predetermined point in each cycle of the revolution of the transducer 15, a mark pulse is generated. It is generated at a given point with reference to a point on the borehole unit 10. The mark pulse is then applied to the oscillator 26.

Oscillator 26 has a frequency slightly less than four times the rotational frequency of transducer 15. Each mark pulse is then used to lock oscillator 26 so that one pulse is at each of four points spaced approximately 90° apart in space. More particularly, as indicated in FIG. 2, the four points are indicated by beams A-D. A series of pulses will be produced by oscillator 26 when the transducer 15 faces the direction A. Other series of pulses will be produced when transducer 15 faces each of directions B, C and D.

The output of oscillator 26 is connected by way of a monostable multivibrator 28 to a four bit binary counter 30. Counter 30 is decoded to provide a one-out-of-four output. Thus, the counter 30 has four output lines 32, 34, 36 and 38. The monostable multivibrator is connected by way of line 40 to one input of each of four AND gates 42, 44, 46 and 48. Counter 30 is connected by way of output line 32 to a second input of AND gate 42 and by way of line 50 to a second input of AND gate 24. Line 34 is connected to AND gate 44, line 36 is connected to AND gate 46, and line 38 is connected to AND gate 48.

AND gate 42 is connected to one input of a sample and hold unit 52.

Cable 11 is also connected to the inputs of two amplifiers 60 and 62. The output of amplifier 60 is connected by way of a gate 64 and a monostable multivibrator 66 to the sample input of each of the units 52, 54, 56 and 58, by way of channel 68. Amplifier 62 is connected by way of a monostable multivibrator 70 to a sawtooth generator 72. Generator 72 is connected to each of the sample and hold units 52, 54, 56 and 58. Monostable multivibrator 70 is also connected by way of a delay unit 74 and a monostable multivibrator 76 to the control input of gate 64.

In operation, the sample and hold units 52, 54, 56 and 58 are rendered operative sequentially by signals from gates 42, 44, 46 and 48, respectively, during each cycle of revolution of the transducer 15. More particularly, sample and hold unit 52 will be rendered effective to make measurement during the time that the acoustic beam scans the sector A, FIG. 2, preferably including an angle of about 5° out of the 360° rotation of the transducer 15. Sample and hold unit 54 is rendered effective to make measurements during sector B, unit 56 during sector C, and unit 58 during sector D. If the transducer rotates at one revolution per second and the transducer is actuated to produce and receive acoustic pulses, 1,700 pulses per second, then during each of the 5° sectors A-D, there will be a series of about 25 pulses transmitted.

The measuring operation serves to produce voltages on capacitors 82, 84, 86 and 88 which are proportional to the time of travel from borehole unit 10 to the appropriate borehole wall and back to the unit 10. Where the velocity of sound is constant, as is generally the case in the borehole fluid, the voltages on condensers 82, 84, 86 and 88 represent the borehole diameter in each of the four points A-D. In the measuring operation itself, the mark pulse is effective through amplifier 62 and monostable multivibrator 70 to initiate generation of a sawtooth voltage by unit 72. This voltage is applied to the sample and hold unit 52, the latter being rendered operative during sector A by gate 42. Delay units 74 and 76 control gate 64 so that the mark pulse will not pass. However, a predetermined time after the transmitted acoustic pulse is transmitted, the gate 64 is opened by action of units 74 and 76. This permits electrical signals on cable 11 which are representative of acoustic energy reflected from the borehole wall and detected by the transducer crystal to be passed from amplifier 60 through gate 64 to monostable multivibrator 66. Multivibrator 66 then applies a sampling pulse to unit 52 to charge capacitor 82 to a voltage representative of the value of the sawtooth voltage from unit 72 at the instant the reflected energy reaches the transducer 15. Thus, there is placed on capacitor 82 a charge proportional to the length of the path in sector A. The operation of the sample and hold is well known and is generally described in prior U.S. Pat. Nos. 2,704,364 and 2,768,701.

In a similar manner, with unit 54 enabled by gate 44, there is placed on capacitor 84 a charge representative of the length of the acoustic path in sector B. Capacitors 86 and 88 in succession acquire charges representative of the lengths of the acoustic paths of sectors C and D, respectively. The voltage on capacitors 82, 84, 86 and 88 are then applied to a recorder 90 to produce traces 92, 94, 96 and 98 which graphically portray variations in borehole diameter in vertical segments of the borehole wall traversed by each of the four sectors A-D. The recordings may be made on suitably scaled paper having reference lines 102, 104, 106 and 108 which represent the true gauge diameter of the borehole.

Sheave 20 is connected by way of linkage 110 to the chart drive on recorder 90 so that the length of the chart represents borehole depth. The displacements of the various traces from the true gauge lines represent variation in borehole diameter.

In a modified form, the invention is illustrated in FIG. 3 wherein the borehole unit 10 cooperates with amplifiers 60, 62, gate 64, monostable multivibrators 66, 70, 74, 76, sawtooth generator 72 and sample and hold unit 52 to charge condenser 82 to a voltage representative at any time of borehole diameter at the points transducer 15 then faces. The operation is as above described except that a single channel is used rather than four channels. In accordance with this embodiment of the invention, a sweep generator 130 is connected by way of line 132 to cable 11 and is responsive to a sync pulse to initiate generation of a horizontal sweep voltage which is synchronized with the rotation of the transducer 15. More particularly, the sweep voltage is applied by way of channel 134 to the horizontal deflection plates of a cathode ray tube 136. The sweep voltage causes the beam to travel horizontally across the face of the tube 136. There is one sweep for each rotation of transducer 15.

The electron beam from gun 138 is turned on and off by the output of an AND gate 140. AND gate 140 is actuated by coincidence between sweep voltage 134 and the output from a depth control unit 142. Depth control unit 142 is actuated by a depth sensing unit 144. In unit 144 a timing sheave is driven in predetermined relation to movement of unit 10 in hole 12. For example, the sheave may rotate timing sheave one revolution for each foot of travel of unit 10 in hole 12. By this means the beam in tube 136 will be turned on for a predetermined period of time, not less than one complete revolution of transducer 15 at each of several successive uniformly spaced elevations of transducer 15 in the borehole.

Figure 4:
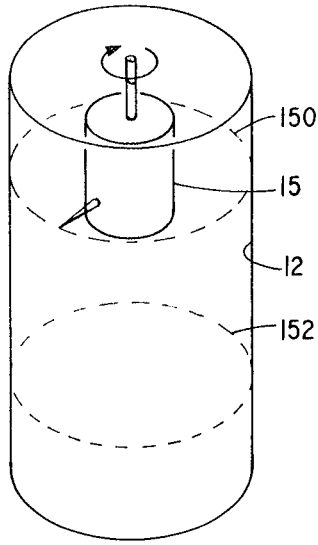
FIG. 4 is an enlarged section of a portion of the borehole with the transducer shown therein.

As shown in FIG. 4, transducer 15 is positioned in borehole 12 at a location such that it scans a horizontal path 150, shown dotted, during one revolution of the transducer 15. The signal from unit 142 enables gate 140 during at least that one revolution. As a result, there may be produced on condenser 82 a voltage which varies in accordance with the diameter of the borehole 12 at the location of the path 150. This voltage is then applied by way of a bias network 146 to the vertical deflection plate of tube 136. By this means, variations in diameter are portrayed by variations in the vertical position of the beam on tube 136. As the unit 10 is lowered through the borehole, the unit 142 will again enable gate 140 so that the borehole diameter at the location of path 152 will be measured. Thus, tube 136 portrays variations in borehole diameter in each of a plurality of successively deeper locations equally spaced in the borehole. The display on tube 136 is then recorded on a film 160 which travels from roll 162 onto roll 164. Film 160 moves proportional to the depth of the unit 10 in the borehole. Traces are successively recorded on the film representing borehole variations at each of the selected depths.

Figure 5:
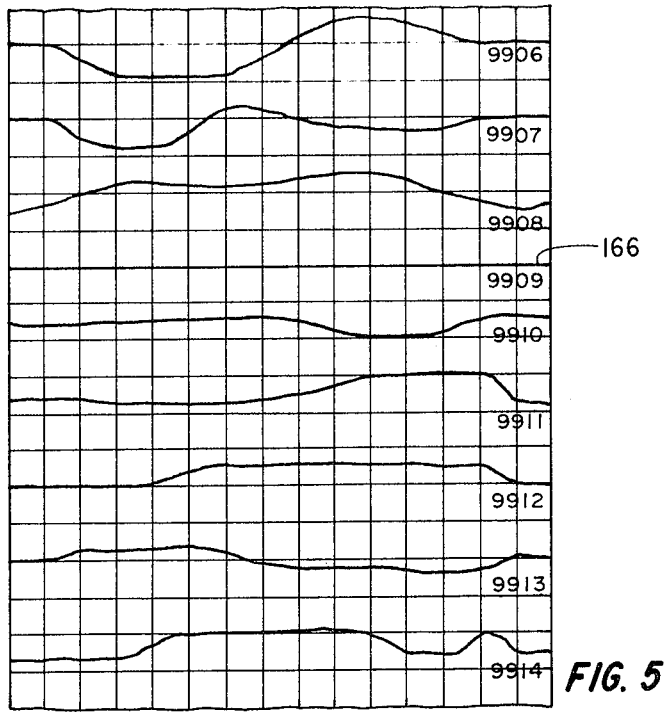
FIG. 5 illustrates the log produced in accordance with the system of FIG. 3.

In FIG. 5 a segment of such a filmstrip has been shown where each of the traces represents the borehole diameter at successively increasing intervals of depth such as one foot intervals. The top trace represents borehole diameter the depth of 9,906 feet. The bottom trace represents variations of the borehole diameter at a depth of 9,914 feet. It will be noted that trace 166, FIG. 5, represents the unusual case of the borehole being at absolutely true gauge diameter.

In this system, the bias is applied and the cathode ray tube is operated such that significant resolution is portrayed as to borehole diameter variations. The bias from unit 146 is such that the borehole center is at some point significantly beyond the face of the oscilloscope tube. The bias can be adjusted along with the gain of the vertical deflection channel of the oscilloscope to provide any desired emphasis on the resolution of the diameter traces.

Thus, while the invention set forth in U.S. Pat. No. 3,369,626 finds its primary utility in measuring the reflectivity of the borehole walls to provide detailed information as to the acoustic nature of the wall, the present invention provides detailed segmented portrayals of the dimensional characteristic of the borehole. In FIG. 1 a continuous diameter log in the vertical direction for each of the four radially separated segments is provided. In FIG. 3 a continuous log over the entire circumference of the borehole is provided for each of the vertically spaced segments of the borehole.

As above noted, the mark pulse may be produced at a time which repeatedly bears a predetermined relation to a given point on the circumference of tool 10.

If the operation is conducted in an uncased hole, the use of a magnetic sensor can be employed in order to assure that the mark pulse is generated at a predetermined compass point. By this means the segments of the borehole in the system of FIG. 1 probed for diameter variations will be vertical. However, if the compass or the like is not employed, but rather the system is employed wherein the mark pulse is produced in a predetermined relation to the orientation of the unit 10, the unit 10 as suspended on cable 11 may spiral as it travels through the borehole and thus the segments represented by the chart in FIG. 1 would be spiral segments.

While the output of the system is shown in FIGS. 1 and 3 as comprising continuous functions recorded on film or recording charts, it will be recognized that the signals representing the charges on the condenser could be converted to digital representation and read or recorded in alphanumeric form rather than in the continuous trace form. In both embodiments described herein, the sawtooth and sampling circuitry could be replaced by a clock, a counter, and a D to A converter in order to generate a voltage proportional to time in manner well known in the art.

The present system may be run simultaneously with logs run in accordance with U.S. Pat. No. 3,369,626 as may be appreciated. This is possible and is of great advantage because operation of the present system does not degrade the borehole signals as they appear at the surface terminals of the logging cable.

What is claimed is:

1. In a well logging system where an acoustic transducer in a logging tool acoustically scans the circumference of the borehole repeatedly and receives acoustic energy reflected from the walls of the borehole in timed relation to transmission dependent upon borehole diameter, the improvement which comprises:

providing a continuous probing of the travel time of acoustic energy from said transducer to said wall and back to said transducer over each of a plurality of vertical segments of said borehole wall where said segments are circumferentially displaced one from the other, and recording a reflection travel time function separately for each of said segments as a function of depth of the scan level in said borehole.

2. The method of claim 1 wherein said segments are vertical with centers thereof displaced approximately 90° one from another.

3. The method of claim 2 wherein each said segment extends approximately 5° in azimuth.

4. The method of claim 2 wherein electrical charges are stored, one for each segment, with each charge adjusted continuously in dependence upon diameter of the borehole at the position of a segment and where each said charge is continuously recorded on a depth related scale where trace amplitude represents hole diameter.

5. A well logging system which comprises:
   a. a borehole tool having an acoustic transducer actuated acoustically to scan the circumference of the borehole repeatedly and to receive acoustic energy reflected from the walls of the borehole in timed relation to transmission dependent upon borehole diameter,
   b. means to generate a scalar function representative of the travel time of acoustic energy from said transducer to said wall and back to said transducer, and
   c. means to record said function separately for each of a plurality of vertical segments of said borehole wall where said segments are circumferentially displaced one from the other in relation to scan depth in said borehole.

6. The system of claim 5 wherein control means enables said logging tool a plurality of short time spaced segments of each of said scans and wherein the recording means includes a plurality of amplitude-depth trace recorders each of which produces a record of each said time functions.

7. In a well logging system where an acoustic transducer in a logging tool acoustically scans the circumference of the borehole by repeatedly transmitting an acoustic pulse and receiving acoustic energy reflected from the walls of the borehole in timed relation to pulse transmission dependent upon borehole diameter, the improvement which comprises:
   a. a plurality of pulse transit time measuring means to generate scalar quantities representative of borehole diameter,
   b. control means to actuate said plurality of measuring means in a predetermined repetitive sequence,
   c. sync means to synchronize said control means to initiate each sequence in predetermined relation to a selected point in each scan cycle to limit said time interval measurement to a plurality of vertical segments of said borehole wall circumferentially displaced one from the other, and
   d. means for recording said scalar quantities separately for each of said segments as a function of depth of the scan level in said borehole.

8. The system of claim 7 wherein said sync means includes an oscillator of a frequency of about four times the scan rate and wherein a sync pulse produced concomitantly with each scan cycle locks said oscillator and wherein counter means responsive to said oscillator output determine said sequence.

9. In a well logging system where an acoustic transducer in a logging tool acoustically scans the circumference of the borehole by repeatedly transmitting an acoustic pulse, receives acoustic energy reflected from the walls of the borehole in timed relation to pulse transmission dependent upon borehole diameter, and generates a voltage whose magnitude increases in a known relation to time following each said acoustic pulse, the improvement which comprises:
   a. a set of $n$ sample and hold units each connected at one input to said generator means,
   b. control means responsive to said reflected energy and operable in relation to a selected point in each scan cycle and connected to second inputs of said $n$ sample and hold units for actuation thereof in a predetermined repetitive sequence during each scan cycle for producing $n$ output voltages representative of the diameter of $n$ vertical segments along the wall of said borehole circumferentially displaced one from the other, and
   c. a set of $n$ means for recording said scalar quantities separately for each of said segments as a function of depth of the scan level in said borehole.

10. The system of claim 9 wherein said control means includes an oscillator of a frequency of slightly less than $n$ times the scan rate and wherein a sync pulse produced concomitantly with each scan cycle locks said oscillator and wherein an $n$ to 1 counter means responsive to said oscillator output determines said sequence.

11. The system of claim 10 where $n = 4$ to produce a log of four quadrant spaced wall segments.

12. The system of claim 9 where $n = 4$ to produce a log of four quadrant spaced wall segments.

13. A well logging system which comprises:
   a. a borehole tool having an acoustic transducer to scan the circumference of the borehole wall repeatedly and to receive reflected acoustic energy,
   b. means to generate a plurality of scalar functions representative of the travel time of acoustic energy from said transducer to said wall and back to said transducer,
   c. control means to limit said scalar functions to a limited angle in azimuth during each scan cycle corresponding to the width of a like plurality of vertical segments of said borehole wall circumferentially displaced one from the other, and
   d. means to record each scalar function separately.

* * * * *